United States Patent [19]

Drower

[11] 4,116,460
[45] Sep. 26, 1978

[54] TRAILER COUPLING
[75] Inventor: Wilfred Drower, Brisbane, Australia
[73] Assignee: Litecraft Pty. Ltd., Brisbane, Australia
[21] Appl. No.: 737,687
[22] Filed: Nov. 1, 1976
[51] Int. Cl.² ............................................. B60D 1/00
[52] U.S. Cl. ............................ 280/478 R; 280/491 R
[58] Field of Search ............... 280/477, 478 R, 478 A, 280/491 R, 491 B, 491 D, 504, 515; 172/272

[56] References Cited
U.S. PATENT DOCUMENTS 2,180,558  11/1939  Stastny ............................ 280/515 X
2,386,195  10/1945  Clark .................................. 280/477
3,904,225   9/1975  George ............................ 280/478 R Primary Examiner—John A. Pekar
Attorney, Agent, or Firm—James C. Wray

[57] ABSTRACT

A trailer coupling comprising a housing, an extensible linkage, one end of which is pivotally mounted on the housing for rotation about a substantially vertical axis, a trailer coupling element or component mounted on the other end of said extensible linkage and means for locking said extensible linkage to the housing when in the fully retracted position whereby substantially the whole of the load is borne by the housing.

2 Claims, 4 Drawing Figures

TRAILER COUPLING

This invention relates to an improved coupling for connecting a trailing vehicle to a towing vehicle.

In such couplings the towing vehicle has to be backed up to the trailing vehicle and the connection (usually of the ball and socket type) coupled together. This requires very accurate manoeuvring of the towing vehicle or manhandling of the trailing vehicle which can be difficult in the case of caravans or loaded trailers.

It has been proposed to have the connection component mounted on the towing vehicle mounted for limited extension from and movement relative thereto, so that less exactness is necessary in vehicle handling.

Such arrangements in the past have, however, had disadvantages. If the extension mechanism has to take the stress of towing, it is difficult to give it sufficient strength to withstand shock loads, and the mechanism, if "telescopic", is liable to damage. The range of movement is also apt to be very limited.

It is an object of this invention to provide a coupling movable relative to the trailing unit which reduces or overcomes these disadvantages.

It is a further object to provide such a coupling in which the towing stress is not borne by the extension mechanism, and in which the extention mechanism is automatically guided during coupling to a locked retracted position.

Broadly the present invention resides in a trailer coupling comprising a housing, an extensible linkage, one end of which is pivotally mounted on the housing for rotation about a substantially vertical axis, a trailer coupling element or component mounted on the other end of said extensible linkage and means for locking said extensible linkage to the housing when in the fully retracted position whereby substantially the whole of the load is borne by the housing.

Preferably the extensible linkage is of the lazy tongs type and the coupling element is mounted thereon so that it is substantially self centering when being moved to the retracted position.

The self centering may be achieved by side guides provided on a member on which the coupling element is mounted, which guides force the linkage to an angular position in which it moves directly without skew to the retracted position.

The invention will be better understood by reference to the following description of one specific embodiment thereof shown in the accompanying drawings wherein.

Figure 1:
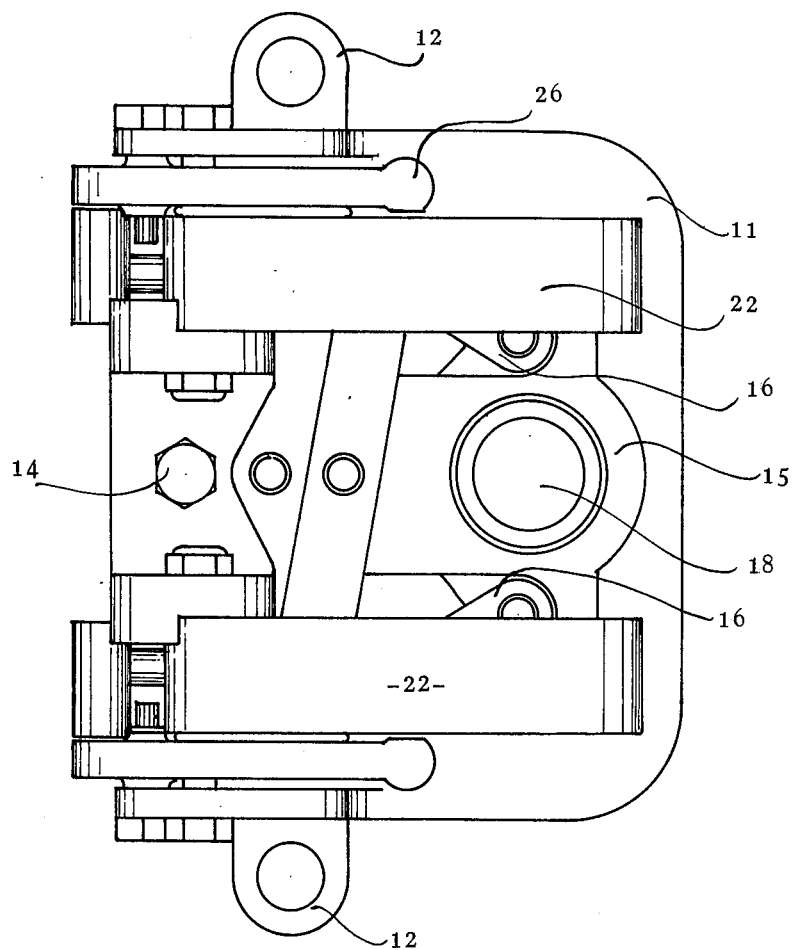
FIG. 1 is a plan view of the coupling in the fully retracted position.

As shown in the drawings the housing comprises a substantially flat plate 11 provided with laterally projecting lugs 12 to enable it to be bolted to the towing vehicle in the desired position. One end of a lazy tongs assembly 13 is pivotally mounted to the plate 11 for rotation about a vertical pin 14. The other end of the lazy tongs assembly is coupled to a transverse plate 15 by short links 16 so that portion 17 of the plate projects between the links 16. A ball 18 of the conventional ball and socket type of coupling is mounted on the plate 15.

Figure 4:
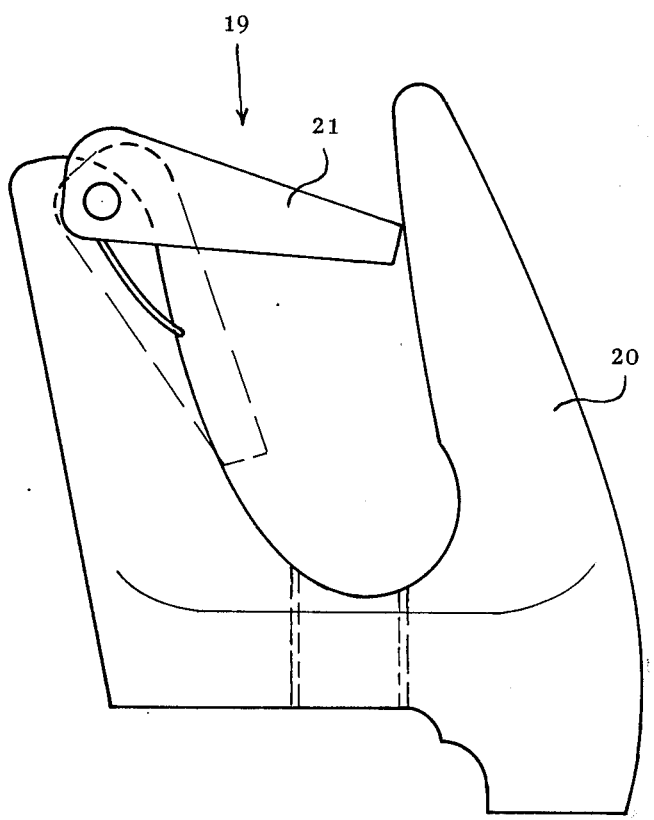
FIG. 4 is an alternative form of coupling component used in place of the ball shown in FIGS. 1, 2 and 3.

Alternatively, the ball may be replaced by a heavier type of coupling component 19 shown in FIG. 4 of the drawings. In the component 19 of FIG. 4 a link (not shown) is passed over a post 20 and is retained in place by a spring loaded keeper 21.

Figure 2:
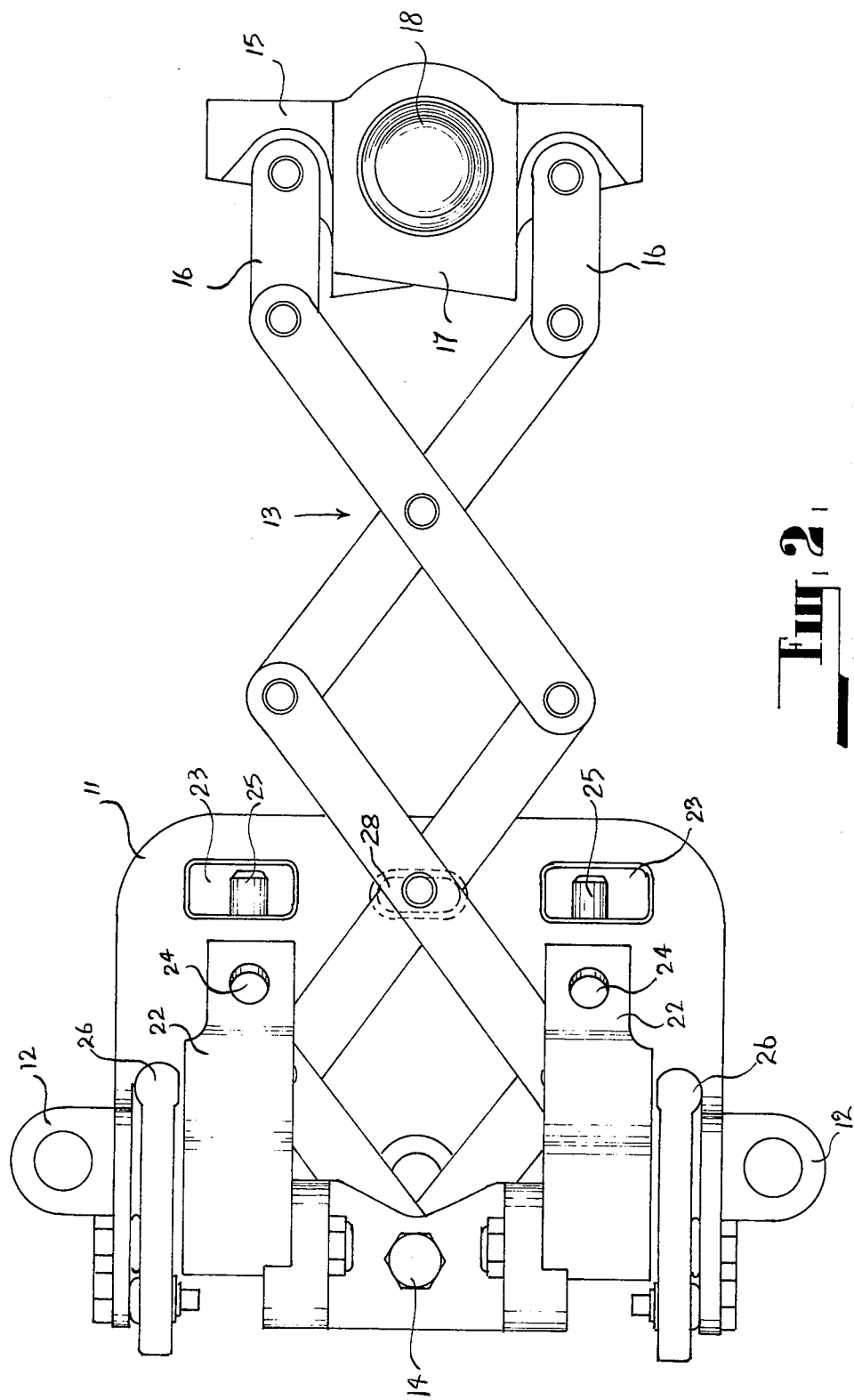
FIG. 2 is a plan view of the coupling in the fully extended position.
Figure 3:
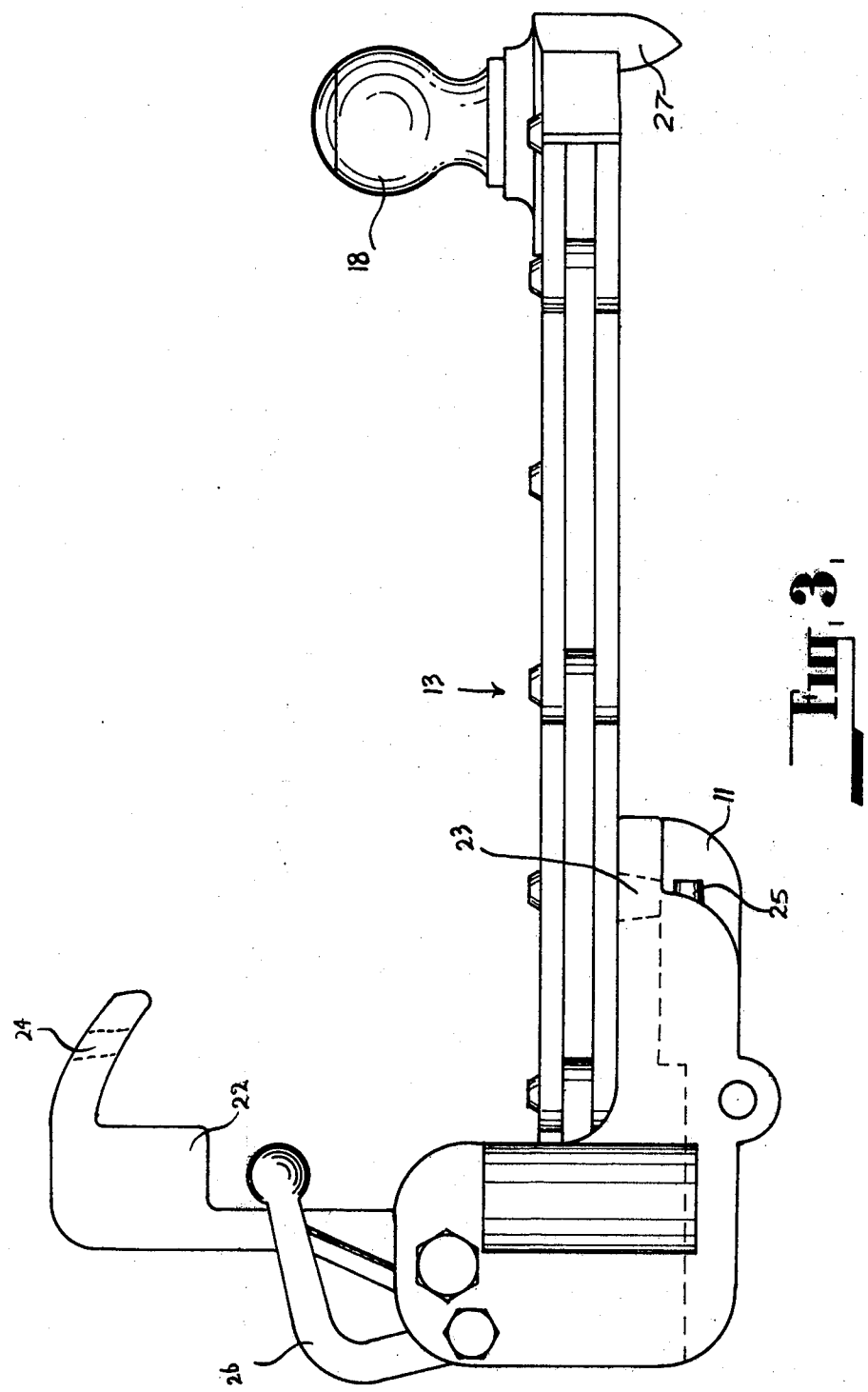
FIG. 3 is a side elevation of the coupling in the fully extended position.

A pair of catches 22 are pivotally mounted on the housing plate 11 for rotation about a horizontal transverse axis. The catches are substantially C-shaped the forward ends being adapted to engage in slots 23 provided in the plate 11 and being provided with holes 24. The catches are preferably biased towards the upper or unlocked position as shown in FIGS. 2 and 3 of the drawings. A pair of pins 25 are slidably mounted on the underside of the plate 11 so that one end of each pin can be moved into and out of position below the corresponding slot 23. The other end of each pin 25 is coupled by a linkage (not shown) to an actuating handle 26 pivotally mounted on the upper face of the plate 11.

In operation the towing vehicle is backed up to the approximate position with the linkage extended. The linkage is rotated about its vertical pivot and its length adjusted to bring the ball 18 to the correct position. When the ball has been coupled to the socket on the trailing vehicle the towing vehicle is backed towards the trailing vehicle. The plate 15 carrying the ball is centralised by the links 16 bearing against the portion 17 of the plate 15. This allows the lazy tongs assembly to concertina easily until a tongue 27 projecting downwardly from the plate 15 is positioned to engage in a slot 28 in the plate 11. The catches 22 are rotated to engage the slots 23 and locked over the plate 15 by operating the actuating handles 26 to engage the pins 25 in the holes 24. In this position the load of the trailing vehicle is transferred to the plate 11 and is not carried by the linkage.

I claim:

1. A trailer coupling comprising a housing, an extensible lazy tongs linkage, one end of which is pivotally mounted on the housing for rotation about a substantially vertical axis, a plate for carrying a trailer coupling element mounted on the other end of said extensible linkage and centering means connected to the linkage and mounted thereon for engaging the plate so that the linkage is substantially self centering when retracting, wherein side guides are provided on said plate, which guides force the linkage to an angular position in which it moves directly without skew to the retracted position, and means for locking said extensible linkage to the housing when in the fully retracted position whereby substantially the whole of the load is borne by the housing.

2. A trailer coupling comprising a housing, an extensible linkage, one end of which is pivotally mounted on the housing for rotation about a substantially vertical axis, a trailer coupling element mounted on the other end of said extensible linkage and means for locking the other end of said extensible linkage to the housing when in the fully retracted position whereby substantially the whole of the load is borne by the housing, and wherein the locking means comprises a locking member one end of which is pivotally mounted on the housing for rotation about a transverse horizontal axis, an intermediate portion of which engages the linkage when retracted and the other end of which passes through a slot in the housing and is engaged by a locking pin, locking the extensible linkage to the housing.

* * * * *